United States Patent

[11] 3,573,598

| [72] | Inventors | Patrick W. Clarke<br>Murray Hill, N.J.;<br>Rudolph Scuderi, New York, N.Y. |
|---|---|---|
| [21] | Appl. No. | 825,195 |
| [22] | Filed | May 16, 1969 |
| [45] | Patented | Apr. 6, 1971 |
| [73] | Assignee | Bell Telephone Laboratories, Incorporated<br>Murray Hill, N.J. |

[54] OVERLOAD PROTECTED SWITCHING REGULATOR-CONVERTER
8 Claims, 1 Drawing Fig.

[52] U.S. Cl. ........................................... 321/2,
321/14, 321/18, 323/22
[51] Int. Cl. ............................................... H02m 3/32,
H02h 7/14, G05f 1/08
[50] Field of Search............................................ 320/1;
321/2, 11, 14, 16, 18, 44, 43; 323/22 (SCR);
307/108

[56] References Cited
UNITED STATES PATENTS

| 3,300,656 | 1/1967 | Meier et al. .................. | 321/2UX |
| 3,320,511 | 5/1967 | Tieman ......................... | 321/2 |
| 3,412,315 | 11/1968 | Hehenkamp .................. | 321/43X |
| 3,454,863 | 7/1969 | Hintz et al. .................. | 307/108X |

*Primary Examiner*—William H. Beha, Jr.
*Attorneys*—R. J. Guenther and E. W. Adams, Jr.

ABSTRACT: A regulated converter wherein a current limiting inhibit circuit connected across the output inductor disables the switching control network until the energy stored in the output inductor, as indicated by the polarity of the potential across the inductor, is dissipated. Overload protection is thus simply provided and RF voltage spikes are eliminated.

Patented April 6, 1971
3,573,598
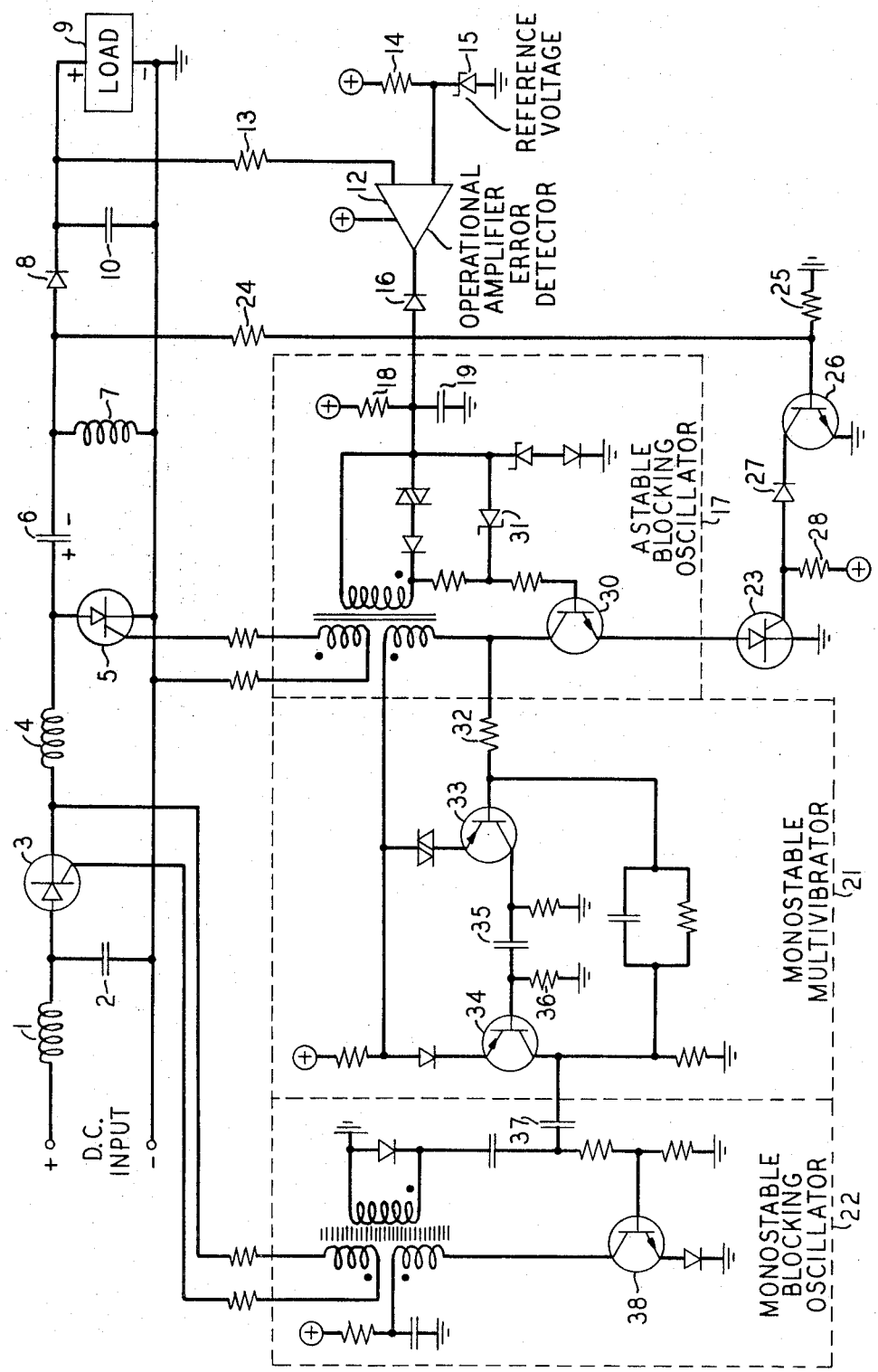
INVENTORS P. W. CLARKE
R. SCUDERI
BY John P. McDonnell
ATTORNEY

OVERLOAD PROTECTED SWITCHING REGULATOR-CONVERTER

BACKGROUND OF THE INVENTION

This invention relates to DC to DC converter circuits and, more particularly, regulated DC to DC converter circuits.

The conversion of a DC voltage or current of one magnitude to a DC voltage or current having a second higher magnitude is usually accomplished with push-pull type oscillator circuits requiring one or more transformers. For applications where relatively large amounts of power are involved, circuits which transfer at least a portion of the total power to be transmitted to an intermediate stage for subsequent transfer to the load are employed. These circuits may include, for example, a first silicon controlled rectifier (hereinafter referred to as SCR) serially connected between the input source and a series resonant inductor-capacitor combination to initially transfer energy from the source to the capacitor, and a second SCR which is conductive at intervals alternate to the conductive intervals of the first SCR to transfer the energy thus stored in the capacitor to the load. The parameters of the series resonant network may be chosen so that the voltage across the capacitor will be greater than the input voltage and the desired DC to DC voltage conversion may thus be obtained. The SCR's in this system are switched at a constant frequency and commutated either by other SCR's or resonant networks. If regulation is desired in addition to conversion, the control circuitry varies the duration of the conductive intervals of the SCR's but not the frequency. In other words, the quanta of energy delivered to the load during each conductive interval of the SCR is varied rather than its switching frequency.

These prior art systems switch the SCR's at a constant frequency for all load conditions, including an overload condition such as a load short circuit, to constantly supply at least some energy to the load. This constant supply of energy will, in a severe overload condition, usually result in the destruction of the circuit components. Additionally, and in common with most switching type regulator and converter circuits, switching the semiconductor devices before the minority carriers in the devices have had time to recombine introduces RF voltage spikes at the output terminals. Additional circuitry, which increases the cost of inversion and limits the circuit flexibility, is often provided to protect the circuit components during overload conditions and filter the RF voltage spikes at the output terminals.

It is, therefore, an object of the present invention to provide a regulated conversion circuit with overload protection that does not require additional circuitry.

Another object of the invention is to provide a semiconductor switching type regulated converter circuit which eliminates RF output voltage spikes at its output terminals.

SUMMARY OF THE INVENTION

In the regulator-converter of the present invention, energy is transmitted from the DC input source to charge a capacitor in a series resonant circuit through the load circuit. The energy thus stored in the capacitor is subsequently transferred to an inductor which is connected across the load by a diode. The charge and discharge cycles of the capacitor are determined by individual SCR's which are triggered by a control circuit which includes a transistor astable blocking oscillator responsive to load voltage variations as its frequency determining component. Overload protection and the elimination of RF voltage spikes at the output terminals are obtained by the use of an inhibit circuit comprising a transistor and an SCR. The input or base-emitter electrodes of the inhibit circuit transistor are connected across the inductor while the output or collector-emitter electrodes of this transistor are connected both to the gate electrode of the SCR and its source of positive gating potential. Whenever the potential across the inductor reverses, the inhibit circuit transistor is biased into conduction to bypass the gating current to the SCR and thereby prevent conduction through the SCR. The anode-cathode path of the SCR is serially connected with the collector-emitter path of the transistor of the astable blocking oscillator so as to prevent oscillation in this circuit when nonconductive. Thus the astable oscillator is inhibited or prevented from initiating a new discharge-charge cycle until the energy in the inductor is sufficiently dissipated such that the reverse potential across the inductor is no longer sufficient to maintain conduction through the inhibit transistor. Since the energy stored in the inductor must thus be dissipated before the capacitor can again be charged, the switching frequency varies in accordance with the quanta of energy supplied to the load and the quanta of energy supplied remains constant. As noted heretofore, the circuits of the prior art inversely permits the quanta of energy delivered to the load to vary while maintaining a constant switching frequency.

The regulator-converter of the present invention inherently provides overload protection since increasing load causes the output voltage to decrease which in turn increases the amount or quanta of energy that the inductor must discharge to maintain the load voltage at the desired magnitude. The inhibit circuit, which as noted is responsive to the energy stored in the inductor, accordingly prevents the discharge-charge cycle of energy transmission from the source to the load for this longer interval and thereby prevents the buildup of excessive energy and accompanying destructive voltages. The circuit is thus inherently overload protected without the need for additional circuitry. Moreover, since at the end of each charge-discharge cycle the current in all the active semiconductor devices is zero, the minority carriers in the junctions of these devices have had a chance to recombine before the devices are switched. Since there is no flow of current in the system due to these minority carriers there is no abrupt interruption of this current and hence no RF output voltage spikes.

BRIEF DESCRIPTION OF THE DRAWING

Other objects and features of the invention will be apparent from the drawing, the single FIGURE of which is a schematic diagram of an embodiment of the present invention.

DETAILED DESCRIPTION

As can be seen from the drawing, a DC input is applied to the input terminals of the converter-regulator. Inductor 1 and capacitor 2 are serially connected across the DC input source as an input filter. A SCR 3 is serially connected with inductor 4 and SCR 5 across the capacitor 2. Capacitor 6 and inductor 7 are connected across SCR 5 which, as discussed hereafter, with inductor 7 provides a discharge path for capacitor 6. Diode 8 is connected from the capacitor 6 to the load 9 and poled for forward conductivity from the capacitor 6 to the load 9. Filter capacitor 10 is connected across the load 9.

The regulating or feedback loop comprises an operational amplifier 12 having one input connected through current limit resistor 13 to the positive terminal of the load 9. A second input to operational amplifier 12 is connected to the junction of resistor 14 and zener diode 15 which are serially connected between a source of positive potential and ground. The zener diode 15 provides the reference voltage for the operational amplifier error detector 10. As discussed in our copending application, Ser. No. 825,368, filed with and assigned to the same assignee as the present invention, resistor 14 may be chosen so as to bias the zener diode 15 on the knee of its reverse breakdown characteristic. In this portion of its characteristic, the zener diode acts as a random noise generator which varies the error signal at the random noise rate and permits the SCR's 3 and 5 to be switched at frequencies in the audible range without unacceptable environmental noise. The operational amplifier error detector 12 may be a single transistor or any of a host of commercially available operational amplifiers such as, for example, the Motorola 1431G.

Diode 16 is connected from the output of error detector 12 to the base circuit of the transistor in the astable blocking oscillator 17 and poled for forward conduction in the } direction from blocking oscillator 17 to the error detector 12. The output of astable blocking oscillator 17 is connected to the input of monostable multivibrator 21 whose output is in turn connected to the input of monostable blocking oscillator 22. As discussed in detail hereinafter, astable blocking oscillator 17 provides triggering or turn-on pulses for SCR 5 through a pair of current limiting resistors. Monostable blocking oscillator 22 provides triggering or turn-on pulses for SCR 3 through a pair of current limiting resistors after delay interval determined by monostable multivibrator 21. The astable blocking oscillator 17 may be one of any number of well-known common emitter blocking oscillator circuits which is simply modified to include a switching device such as SCR 23 serially connected between the emitter circuit and ground. Similarly, monostable multivibrator 21 and monostable blocking oscillator 22 may also be any of a large number of well-known circuits whose operation is sufficiently described in basic texts to forego further discussion at this time. The monostable blocking oscillator circuit 22 illustrated in the drawing is a common emitter blocking oscillator circuit using a transformer having a rectangular B-H, or saturable, core characteristic.

The inhibit circuit comprising SCR 23 has a voltage divider comprising resistors 24 and 25 serially connected across the inductor 7. The base electrode of gating transistor 26 is connected to the juncture of resistors 24 and 25, while the emitter electrode of this transistor is connected to ground. Diode 27 is connected in the forward conductivity direction from the gate electrode of SCR 23 to the collector electrode of transistor 26 to limit the voltage across the gate-cathode electrodes of SCR 23. Resistor 28 is connected from the juncture of diode 27 and the gate electrode of SCR 23 to a source of positive potential to provide a source of triggering or conduction initiating bias for SCR 23.

As noted, the regulating and conversion portion of the present circuit comprises an input loop which includes SCR 3, capacitors 2, 6, and 10, diode 8, and inductor 4, and an output loop which also includes capacitors 6 and 10 in addition to SCR 5 and inductor 7. Inductor 1 is a filter inductor, input capacitor 2 serves as a low impedance source for the input loop, and output capacitor 10 is chosen to have a relatively large value of capacitance so that the value of the voltage across it is essentially a constant value of DC Conversion is achieved by the characteristic action of the resonant LC components in the input loop to charge the common capacitor 6 to a voltage greater than the input voltage. (In general, it will be recalled that a series resonant LC circuit without appreciable damping characteristically charges the capacitor to a voltage having a magnitude twice that of the input voltage to the network minus any voltage that may have been stored in the capacitor).

The operation of the present circuit is most easily explained by assuming that the circuit has been in operation for a few cycles with SCR 3 pulsed into conduction by the monostable blocking oscillator 22 and SCR 5 nonconductive. During this condition, capacitor 6 charges from the DC input source to a potential having the polarity shown in the drawing with this charging current also flowing through the now forward biased diode 8 to supplement the charge on the large output capacitor 10. This input loop resonates at the frequency determined by the series network comprising inductor 4 and capacitor 6. Capacitor 6 is thus charged to a potential which is twice the magnitude of the DC input potential less the potential stored in the output capacitor 10. When the resonant current in this loop falls to a value less than the inherent forward sustaining current of SCR 3 (close to the zero axis crossing of the negative going resonant current), SCR 3 is biased out of conduction and the input loop is interrupted.

In the manner to be discussed hereinafter, astable blocking oscillator 17 triggers SCR 5 into conduction after the conduction through SCR 3 is interrupted. Once SCR 5 is conductive, the voltage across capacitor 6 is equal to the voltage across inductor 7 and these elements resonate at the frequency determined by their parameters. These elements continue to resonate until the voltage across inductor 7 reverses and is greater than the voltage stored in capacitor 10 by an amount equal to the forward voltage drop across diode 8. Diode 8 is thus forward biased at this point and clamps the voltage across capacitor 6 to the output voltage across capacitor 10 less the small forward voltage drops across SCR 5 and diode 8. Since the large capacitance of output capacitor 10 results in this capacitor acting as a low impedance constant voltage source with respect to the remaining converter components, the current due to the stored energy in inductor 7 now flows as a ramp function into capacitor 10 to maintain the voltage across this capacitor at the desired load voltage. Once the diode 8 is forward biased, the current through SCR 5 falls to zero and the SCR is thus commutated or cutoff. After a predetermined interval determined by monostable multivibrator 21, which is sufficient to allow the stored minority charges in SCR 5 to dissipate, monostable blocking oscillator 22 again biases SCR 3 into conduction to recharge capacitor 6 and maintain forward conduction through diode 8 to permit all the energy stored in inductor 7 to be dissipated. The discharge-charge cycle of capacitor 6 cycle then repeats itself.

As noted heretofore, the regulating feedback loop which controls the point in the cycle at which SCR's 3 and 5 are triggered into conduction comprises error detector 12, an inhibit circuit comprising SCR 23 and transistor 26, an astable blocking oscillator 17, a monostable multivibrator 21, and a monostable blocking oscillator 22. The error detector 12 compares the voltage at the positive terminal at the load 9, with the potential across the reference voltage of zener diode 15 which, as noted heretofore, may also serve as a noise generator. Alternatively, a separate reference potential may be used for the error detector 12 with the noise signal output from the zener diode 15 coupled through a capacitor to the reference voltage input to the error detector 12. If switching frequencies higher than the audio range are desired, the noise generator may be eliminated entirely and a single zener diode used as a reference voltage.

Whenever the voltage across the load as transmitted by resistor 13 to the input of the error detector 12 is less than the voltage at the reference voltage input of error detector 12, the output error signal voltage of error detector 12 is of sufficient magnitude to back-bias diode 16. For load voltages where the input from resistor 13 is higher than the reference voltage the output of error detector 12 permits diode 16 to be forward biased. If the diode 16 is back-biased by the output of the error detector 12, capacitor 19 of the blocking oscillator 17 is allowed to charge and normally initiate one or several cycles of astable oscillation in the astable blocking oscillator 17, i.e., the oscillator 17 is allowed to operate in its normal astable mode. When the load voltage input to error detector 12 is higher than its reference voltage input, however, diode 16 is forward biased and capacitor 19 is kept from charging by the low output impedance of the error detector 12. Oscillation in the astable blocking oscillator 17 is therefore prevented and no triggering or conduction initiating pulses will be delivered to either SCR 5 or 3 until the load voltage decreases below the reference voltage. As discussed in detail hereinafter, oscillation through the astable blocking oscillator 17 is also controlled by the inhibit circuit comprising SCR 23 and transistor 26 until the energy stored in inductor 7 is dissipated during each cycle of energy transfer and storage.

As discussed, whenever diode 16 is reverse-biased by the output signal from the error detector 12, capacitor 19 of blocking oscillator 17 charges through resistor 18 and regeneratively initiates increasing conduction through transistor 30 in the well-known regenerative sequence of a blocking oscillator controlled by an RC network. The regeneratively increasing voltage thereby induced in the primary winding of the blocking oscillator transformer, which is connected to the base circuit of transistor 30, breaks down zener diode 31 to provide additional base drive to transistor 30 and thereby accelerates the regenerative process. A voltage resembling a pulse is thereby induced in the tertiary winding of the oscillator transformer to which the gate-cathode electrodes of SCR 5 are connected. SCR 5 is thus triggered or biased into conduction. Once zener diode 31 beings to conduct in the zener direction, capacitor 19 discharges and charges through the base-emitter path of transistor 30 and the conductive SCR 23 to a potential of the opposite polarity which is limited by the potential across zener diode 31. Once capacitor 19 is charged to this opposite potential, transistor 30 turnsoff due to lack of base current and the voltages across the astable blocking oscillator 17 transformer windings fall to zero. A diode and varistor are connected across the primary winding of the transformer to limit the reverse voltage across the transformer. A zener diode and diode are connected across capacitor 19 to limit the maximum voltage that may appear across capacitor 19 when SCR 23 is non conducting.

At the same time conduction through transistor 30 of astable blocking oscillator 17 is initiated, the "pulse" of potential at the collector electrode of transistor 30 is transmitted via resistor 32 to the input transistor 33 of monostable multivibrator 21. Since the operation of a monostable multivibrator such as the monostable multivibrator 21 is well known, it is not discussed further at this time. For present purposes it appears sufficient to note that the change in potential at the collector electrode of transistor 30 biases the normally-off multivibrator transistor 33 into conduction and the normally-on multivibrator transistor 34 into cutoff. After an interval of time determined by the capacitor 35 and resistor 36, transistor 33 again cutsoff and transistor 34 again becomes conductive. Conduction through transistor 33 lowers the potential at its emitter electrode. This change in potential is transmitted via capacitor 37 to the input of the monostable blocking oscillator 22 to initate a cycle of oscillation in this circuit.

The change in potential at the emitter electrode of transistor 34 initiates conduction through transistor 38 of monostable blocking oscillator 22. Conduction through transistor 38 produces a voltage across the windings of the transformer, which has a saturable core, of this blocking oscillator to initiate the well-known regenerative blocking oscillator regenerative cycle. The voltage induced in the tertiary winding of the transformer is transmitted to the gate-cathode electrodes of SCR 3 to initiate conduction in this device. The regenerative voltages in this transformer also drive transistor 38 further into conduction in typical blocking oscillator fashion until the core of the transformer saturates. Once the core saturates, the base current in transistor 38 decays to zero and the transistor returns to its normally cutoff state. The discharge-charge cycle of the converter portion of the circuit is thereby completed.

As noted heretofore, the circuits of the prior art have a switching frequency which is kept constant even in the event of an overload condition. The amount of energy transmitted to the load, but not the frequency at which it is transmitted, in these circuits is varied in accordance with load conditions, with an overload condition causing increased transmission of energy to the load at the constant switching frequency. In other words, some energy, down to some minimum value determined by the circuit parameters, is transmitted to the load each time the switching devices are biased into conduction. Thus the quanta of energy transmitted to the load is varied while the switching frequency is held constant. Additionally, the minority carriers stored in the semiconductor switching devices in these circuits causes RF voltage spikes at the converter output terminals due to the abrupt interruption of minority carrier current flow through these semiconductor devices. Elimination of these RF spikes requires relatively expensive filtering networks.

In the present invention, however, the error detector 12 and the inhibit circuit comprising SCR 23 and transistor 26 allow the switching frequency to vary with the amount or quanta of energy transmitted held constant. The input to the inhibit circuit is connected across the output inductor 7 to determine when the energy stored in inductor 7 is dissipated. Once the energy stored in inductor 7 is dissipated, the astable blocking oscillator 17 is allowed to function in the manner described heretofore, and a further quanta of energy is transmitted to the inductor 7 in the manner discussed heretofore. Thus the quanta of energy transmitted to the load is fixed, while the switching frequency is allowed to vary. As will be seen from the following discussion, this arrangement inherently provides overload protection and eliminates the RF voltage spikes normally found in switching regulator and inverter circuits.

SCR 23 is serially connected between the emitter electrode of astable blocking oscillator transistor 30 and ground. Thus, whenever the SCR 23 is not conducting, the oscillator circuit is inhibited or disabled. The input to the inhibit circuit comprising SCR 23 is formed by a voltage divider comprising resistors 24 and 25 which are serially connected across the output inductor 7. The base-emitter path of transistor 26 is connected across resistor 25 so that transistor 26 becomes conductive whenever the polarity of the potential across inductor 7 is such as to make the base electrode of transistor 26 positive with respect to its emitter. Recalling that energy is stored in inductor 7 when SCR 5 is pulsed into conduction to discharge capacitor 6 into inductor 7, it will be readily seen that transistor 26 is held cutoff by the potential across inductor 7 during the initial portion of this energy transfer interval. The output loop comprising capacitor 6 and inductor 7 resonates through the conductive SCR 5 until the polarity of the potential across inductor reverses. Once the polarity across the inductor 7 reverses and is greater than the voltage stored in capacitor 10 by an amount equal to the forward voltage drop across diode 8, diode 8 is forward biased into conduction and the energy stored in inductor 7 discharges into capacitor 10 to maintain the desired load voltage, as discussed heretofore. Once diode 8 is forward biased, the forward current flow through SCR 5 falls to a magnitude less than that required to maintain conduction through the SCR, which then cutsoff.

Prior to the reversal of the polarity of the potential across inductor 7, SCR 23 of the inhibit network was conductive during each cycle of oscillation of oscillator 17 due to the continuous gate current provided by resistor 28 which is connected to a source of positive potential. The astable blocking oscillator 17 was thus allowed to oscillate freely in the typical astable manner discussed. Once the polarity of the potential across inductor 7 reverses, however, the potential across resistor 25 exceeds the forward base-emitter threshold voltage of transistor 26 and this transistor is biased into conduction. Once transistor 26 is conductive, the SCR 23 gate current from resistor 28 is diverted through the collector-emitter path of this transistor to prevent conduction through SCR 23 during the next cycle of oscillation in the astable blocking oscillator 17. (SCR 23 normally commutates as the current decreases to zero through the collector-emitter path of transistor 30 after each cycle or pulse and, since gating or triggering bias is normally continually supplied, is automatically biased into conduction for the next cycle or pulse of the oscillator 17). Since current cannot now flow through the collector-emitter path of transistor 30, the astable blocking oscillator 17 is thus disabled and no further triggering pulses will be transmitted to either SCR 3 or 5. Once the energy stored in inductor 7 is dissipated, however, the voltage across resistor 25 will no longer be sufficient to maintain conduction through transistor 26, SCR 23 will again be biased into conduction, and the astable blocking oscillator 17 will function in the manner described heretofore.

Controlling the feedback loop in this manner provides overload protection and eliminates the RF voltage spikes normally encountered with switching regulator and converter circuits. Overload protection, including load short circuit protection, is obtained since increasing load causes the output voltage across capacitor 10 to decrease which in turn increases the quanta of energy that inductor 7 must discharge to maintain the load voltage. (This is readily seen once it is remembered that inductor 7 linearly discharges through the large capacitance capacitor 10 until the energy stored in the inductor is dissipated which for overloads and lower capacitor 10 voltages will require longer intervals than for loads in the normal range). Taking the extreme case of a load short circuit, the inductor 7 will discharge at only a negligible rate, transistor 26 will remain conductive, and the inhibit circuit comprising SCR 23 will remain cutoff to prevent astable oscillator 17 and SCR 5 from again becoming conductive. No further energy will thus be transmitted through the system and the components of the converter-regulator will be protected from damage due to the transmission of excessive energy caused by an overload condition.

The RF voltage spikes normally encountered are eliminated since, as can be seen from the foregoing discussion, conduction through the active semiconductor devices is terminated for intervals sufficient to allow the minority carriers in these devices to recombine before these devices are again switched. Since there is no flow of minority carriers at the time of switching, there is no abrupt interruption thereof and, hence, no RF voltage spikes.

In summary, then, the present invention is directed to a regulated DC to DC converter wherein energy is transmitted from a DC input source to a capacitor, stored in the capacitor, and then subsequently discharged into an inductor which also stores energy. An output capacitor receives energy from the source during the initial charge interval of the capacitor and later from the discharging inductor. This output capacitance is chosen to have a capacitive value sufficiently large such that the capacitor acts as a relatively constant voltage source after a few cycles of operation of the regulated converter. The regulating feedback loop employs an error detector which permits oscillation in an astable blocking oscillator whenever the load voltage is less than a predetermined reference level. The astable blocking oscillator, in turn, supplies triggering pulses to the switching devices and thereby controls the conduction through the switching regulating devices. The astable blocking oscillator is, in turn, also controlled by an inhibit circuit which monitors the voltage across the output inductor and disables the astable blocking oscillator whenever the polarity of the potential across the inductor reverses until the energy stored in the inductor is dissipated. Overload protection is thus inherently provided and since the minority carrier current in the active devices is zero at the time they are switched, RF voltage spikes are eliminated.

We claim:

1. An overload protected regulator-converter comprising switching means connected between a source of input energy and a load, control means responsive to load voltage variations connected to said load and said switching means to control the switching intervals of said switching means, an energy storage network connected with said input source, said switching means, and said load to store energy from said input source and discharge said stored energy to said load during alternate intervals determined by said switching means under the control of said control means, said energy storage network including at least an inductor connected across said load, and inductor voltage responsive disabling means connected to said inductor and said control means to disable said control means whenever the energy stored in said inductor is discharging and thereby prevent said switching means from initiating a new cycle of energy transfer.

2. A regulator-converter in accordance with claim 1 wherein said control means includes an astable oscillator and said disabling means is connected to at least one active element of said astable oscillator.

3. A regulator-converter comprising a first switching device serially connected with an input DC source, a capacitor, and a load, an inductor connected across said load, an error detector connected to said load to provide an error signal corresponding to load voltage variations, a control circuit comprising an astable oscillator connected to said first switching device and said error detector to control conduction through said first switching device in accordance with variations in load voltage, a second switching device serially connected with said inductor and said capacitor and to said control circuit, said second switching device also being conductive at intervals determined by the error signal from said error detector to discharge said capacitor through said inductor, said second switching device also being conductive at intervals alternate to the conductive intervals of said first switching device to charge said capacitor, and voltage responsive disabling means connected across said inductor and to said astable oscillator to inhibit oscillation in said oscillator whenever the energy stored in said inductor is discharging and thereby prevent said control circuit from initiating conduction through said first and second switching devices during this energy discharging condition.

4. A regulator-converter in accordance with claim 3 wherein said error detector provides a first output signal for load voltages less than a predetermined magnitude and a second output voltage for load voltages greater than said predetermined magnitude.

5. A regulator-converter in accordance with claim 3 wherein said astable oscillator is a transistor astable blocking oscillator.

6. A regulator-converter in accordance with claim 5 wherein said disabling means includes a third switching device serially connected with the collector-emitter path of the said astable blocking oscillator transistor.

7. A regulator-converter comprising a first controlled rectifier serially connected with a source of DC input potential, a first inductor, a capacitor, a diode, and a load, said diode being poled for forward conduction in the same direction as said first controlled rectifier, an error detector connected to said load to provide a first output signal for load voltages less than a predetermined magnitude and a second output signal for load voltages greater than a predetermined magnitude, a transistor astable blocking oscillator connected to the output of said error detector and to the gate electrode of a second controlled rectifier, a delay network having its input connected to a second output of said astable blocking oscillator, a monostable multivibrator having its input connected to the output of said delay network and its output connected to the gate electrode of said first controlled rectifier, a second inductor connected across said diode and said load, said second controlled rectifier being connected across said capacitor and said second inductor to discharge said capacitor through said inductor at intervals determined by said error detector, said delay network providing sufficient delay so that said first controlled rectifier is conductive at intervals alternate to the conductive intervals of said second controlled rectifier to charge said capacitor, and a inhibiting network comprising a third controlled rectifier and a transistor, said third controlled rectifier being serially connected with the collector-emitter electrodes of the transistor of said astable blocking oscillator, said inhibit network transistor having its input electrodes connected across said second inductor and its output electrodes connected across the gate and cathode electrodes of said third controlled rectifier and to a source of biasing potential to prevent conduction through said third controlled rectifier whenever the energy stored in said inductor is discharging.

8. A regulator-converter in accordance with claim 7 wherein a second capacitor having a capacitance greater than said first capacitor is connected across said load to function essentially as a constant output voltage source.